March 14, 1939.  R. THILENIUS  2,150,616
PRESERVATION OF FOODSTUFFS
Filed Nov. 12, 1937
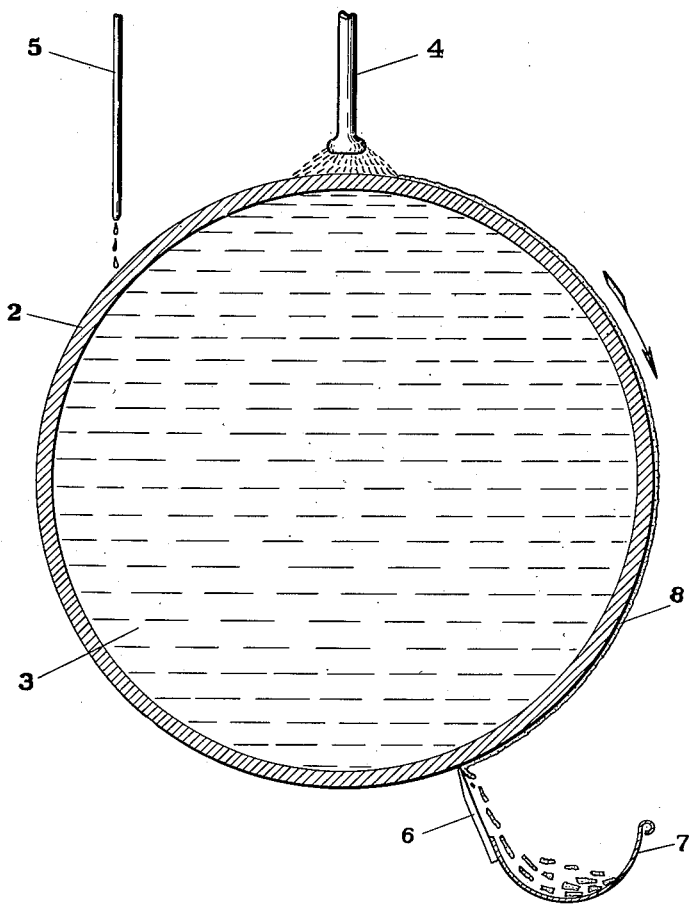
INVENTOR.
RUDOLF THILENIUS
BY
*E. H. O'Brien*
ATTORNEY.

Patented Mar. 14, 1939

2,150,616

UNITED STATES PATENT OFFICE 2,150,616

PRESERVATION OF FOODSTUFFS

Rudolf Thilenius, Frankfort-on-the-Main, Germany, assignor to Deutsche Gold und Silber Scheideanstalt, vormals, Roessler, Frankfort-on-the-Main, Germany, a corporation of Germany Application November 12, 1937, Serial No. 174,220
In Germany November 20, 1936

8 Claims. (Cl. 99—192)

This invention relates to a process for the preservation of fish, meat, or other perishable foodstuffs. More particularly, it relates to a process for preparing improved preserving agents, more especially agents comprising hydrogen peroxide and ice in association.

It is one of the objects of this invention to develop a process for the manufacture of ice containing hydrogen peroxide which will insure a relatively high concentration of the peroxide in the resulting ice. Another object of this invention is the storage of ice containing hydrogen peroxide, after its manufacture, under such conditions that separation of the hydrogen peroxide to an undesirable extent cannot occur. Other objects of the invention will be apparent from the ensuing disclosure.

The use of ice containing hydrogen peroxide for the preservation of foodstuffs is already known to specialists in food preservation. Ice containing hydrogen peroxide has been found especially valuable for the storage of fish, this perishable foodstuff being usually packed in ice containing hydrogen peroxide immediately after it is caught.

Unfortunately, however, it has been impossible in the past to prepare ice with a sufficiently high concentration of hydrogen peroxide. When ice has been manufactured from dilute solutions of hydrogen peroxide by ordinary cooling and freezing it has been observed that even with relatively high concentrations of hydrogen peroxide in the solution the resulting concentration of the hydrogen peroxide in the ice was extremely low. For example, when ice is prepared from dilute solutions of hydrogen peroxide of 0.5 to 1% hydrogen peroxide concentration there results an ice which contains only about 0.05% hydrogen peroxide. This lowering in peroxide content is attributable to concentration of the hydrogen peroxide in the solution during freezing and separation of that hydrogen peroxide during the latter stages of the freezing operation.

In order to secure a satisfactory ice containing hydrogen peroxide with peroxide content sufficiently high to constitute an effective sterilizing agent, it is essential to avoid separation of the hydrogen peroxide from the solution during freezing. Accordingly, I have developed a method of freezing which avoids separation and separate freezing of the hydrogen peroxide to any deleterious degree. By avoiding such separation there results even from relatively dilute solutions of hydrogen peroxide an ice containing hydrogen peroxide in relatively substantial amounts.

My process may be carried out by lightly spraying the solution of hydrogen peroxide to be frozen, for example, a solution of 0.5 to 2% hydrogen peroxide concentration, on a cooling element which has been cooled to such a relatively low temperature that the solution freezes almost immediately. If desired, the solution may be permitted to drip on the cooling device. A suitable freezing element may consist of a rotating drum, roller or similar element which is cooled from the interior and upon which the hydrogen peroxide solution to be frozen is either allowed to drip or is sprayed lightly from the exterior. Rapid freezing of the solution under these conditions has proven to be very advantageous, the resulting ice containing hydrogen peroxide containing substantially as much hydrogen peroxide as was present in the original solution.

In the appended drawing the element 2 represents a rotating drum which is cooled to a relatively low temperature, one sufficient to result in almost immediate freezing of the hydrogen peroxide by the application of a freezing element such as cooled brine to its interior 3. Dilute hydrogen peroxide solution such as, for example, of hydrogen peroxide content ranging from 0.05 to 2%, may be sprayed onto the rotating drum through nozzle 4 or may be permitted to drip onto the rotating drum through the drip pipe 5. Immediately upon striking the surface of the drum freezing occurs so rapidly that the hydrogen peroxide and ice are frozen to a substantially homogeneous solid before any separation of the hydrogen peroxide from the ice can occur. If desired, the solution to be frozen may also contain a buffer salt as explained subsequently. A scraper element 6 scrapes off the ice containing hydrogen peroxide which is then collected in collecting vessel 7.

It is also advisable to add to the solution prior to freezing, buffer salts such as an alkali metal bisulfate, betaine hydrochloride, or some similar buffer salt. I have found it desirable to add from 0.02 to 0.1 gram of a buffer salt such as sodium bisulfate, $NaHSO_4$, to 100 grams of the hydrogen peroxide solution which is subjected to rapid freezing.

Even though the concentration of hydrogen peroxide in the resulting ice containing hydrogen peroxide is relatively large, due to the manufacture of this ice in accordance with the method previously set forth, it has been observed that when the ice containing hydrogen peroxide melts, the hydrogen peroxide in relatively high concentration melts and runs off first leaving behind almost pure ice or ice with a relatively low content of hydrogen peroxide. This separation of hydrogen peroxide and ice is, of course, objectionable as it results in the loss of the greater part of the preserving properties of ice which has been kept in storage for substantial periods of time. In the preservation of fish this separation of hydrogen peroxide from the ice upon storage has been most objectionable for fishing vessels are ordinarily forced to store the ice containing hydrogen peroxide for relatively long periods of time at temperatures near its melting point. Even when the dispersion of hydrogen peroxide throughout the ice is relatively uniform it has been observed that the hydrogen peroxide is brought to the surface of the cakes of ice through cracks, pores, or similar crevices therein by the pure water formed from the melted ice. When ice containing hydrogen peroxide is stored at temperatures substantially near its melting point the water resulting from the melted ice drips off with the greater portion of the hydrogen peroxide, leaving behind ice with is practically free from this active preserving and sterilizing agent.

I have now observed that it is advisable to cool the ice containing hydrogen peroxide to a temperature substantially below its condensation temperature so that melting out of the hydrogen peroxide with consequent reduction in the peroxide content of the remaining ice, is materially lessened or entirely prevented. This involves storing the ice containing hydrogen peroxide prior to its use or until immediately before its use at a temperature such that thawing out of the hydrogen peroxide from the ice is prevented. In most cases cooling of the ice containing hydrogen peroxide to a temperature of from $-1°$ to $-3°$ C. is sufficient to eliminate substantially all melting out of the hydrogen peroxide. This cooling may be accomplished by methods now known to the art, for example, by keeping the ice in rooms maintained at a temperature slightly below condensation temperature or by adding from time to time to the ice small amounts of solid carbon dioxide. Of course, other suitable means may also be adopted for storing the ice containing hydrogen peroxide at a temperature low enough to prevent thawing out of the hydrogen peroxide and separation from the ice.

Ice containing hydrogen peroxide which has been cooled to a temperature so far below its condensation point that melting out of the hydrogen peroxide is prevented is especially advantageous for use on fishing vessels for the preservation of fish. It is also advantageous for any preservation problem where it is necessary to store the ice containing hydrogen peroxide for substantially long periods before it is brought into contact with the agent it is desired that it shall preserve. Experiments carried out utilizing my improved ice containing hydrogen peroxide in substantially large amounts obtained by the rapid freezing method previously described have given excellent results even where it was necessary to store the ice at relatively low temperatures, temperatures of $-1°$ to $-3°$ C. for substantially long periods of time. Fish so preserved were found to be extraordinarily fresh and of excellent flavor even after relatively long periods of storage.

It should be understood that the details of my invention which have been previously given are to be regarded as illustrative and not restrictive except insofar as necessitated by the appended claims. Since various changes and variations may be made in the invention as described without departing from the true scope or spirit of that invention the claims are to be regarded as defining its true scope.

I claim:

1. A process for preserving perishable foodstuffs which comprises preparing an ice containing hydrogen peroxide by rapid freezing of a solution of hydrogen peroxide containing from about 0.1 to about 0.5% of hydrogen peroxide and maintained at a pH value between 3 and 5, in a thin layer, and thereafter bringing said perishable foodstuffs into contact with said ice containing hydrogen peroxide.

2. A process as defined in claim 1 wherein the dilute hydrogen peroxide to be frozen is permitted to flow in a thin layer onto the surface of a cooled rotating drum.

3. A process for preserving perishable foodstuffs which comprises rapidly freezing a solution of hydrogen peroxide containing from about 0.1 to about 0.5% of hydrogen peroxide and sufficient of a buffer salt to maintain its pH value within the range 3 to 5, and thereafter contacting the perishable foodstuffs with said ice containing hydrogen peroxide and buffer salt.

4. A process as defined in claim 3 wherein the buffer salt is sodium bisulfate.

5. A process for manufacturing an ice containing hydrogen peroxide which comprises rapidly freezing a solution of hydrogen peroxide containing from about 0.1 to about 0.5% of hydrogen peroxide and maintained at a pH value between 3 and 5, in a thin layer under such conditions that substantial separation of hydrogen peroxide does not occur.

6. A process for preparing an ice containing hydrogen peroxide which comprises freezing a solution of hydrogen peroxide containing from about 0.1 to about 0.5% of hydrogen peroxide and maintained at a pH value between 3 and 5, by permitting said solution to flow in a thin layer onto a cooled rotating roller whereon it is frozen so rapidly that substantial separation of hydrogen peroxide does not occur.

7. A process as defined in claim 6 wherein the solution of hydrogen peroxide which is subjected to rapid freezing is one containing sufficient sodium bisulfate as a buffer salt to maintain its pH value within the range 3 to 5.

8. A process as defined in claim 6 wherein the solution of hydrogen peroxide which is subjected to rapid freezing is one containing sufficient betaine hydrochloride as a buffer salt to maintain its pH value within the range 3 to 5.

RUDOLF THILENIUS.